United States Patent [19]
Ward et al.

[11] Patent Number: 5,365,485
[45] Date of Patent: Nov. 15, 1994

[54] FIFO WITH FAST RETRANSMIT MODE

[75] Inventors: M. Dwayne Ward, Garland; Kenneth L. Williams, Richardson; Kevin J. Craig, McKinney, all of Tex.

[73] Assignee: Texas Instruments Incorporated, Dallas, Tex.

[21] Appl. No.: 156,115

[22] Filed: Nov. 22, 1993

[51] Int. Cl.$^5$ .................. G11C 7/00; G11C 21/00
[52] U.S. Cl. .................. 365/221; 365/189.01; 365/230.01; 365/230.03; 365/239
[58] Field of Search .................. 365/221, 230.03, 239, 365/230.01, 240, 78, 189.01

[56] References Cited

U.S. PATENT DOCUMENTS

| | | | |
|---|---|---|---|
| 4,954,988 | 9/1990 | Robb | 365/189.02 |
| 4,985,867 | 1/1991 | Ishii et al. | 365/221 |
| 5,084,841 | 1/1992 | Williams et al. | 365/189.07 |
| 5,249,154 | 9/1993 | Tai et al. | 365/221 |
| 5,255,242 | 10/1993 | Ward et al. | 365/230.03 |
| 5,267,191 | 11/1993 | Simpson | 365/221 X |
| 5,274,600 | 12/1993 | Ward et al. | 365/221 |

*Primary Examiner*—D. Hyun Yoo
*Attorney, Agent, or Firm*—Christopher L. Maginniss; W. James Brady, III; Richard L. Donaldson

[57] ABSTRACT

A clocked first-in first-out (FIFO) memory includes interleaved dual-port static random access memories (SRAM's) 32 and 36. The FIFO has status flags 44 to indicate empty and full conditions and two programmable flags, almost full and almost empty, to indicate when a selected number of words is stored in memory. In accordance with the present invention, the FIFO has retransmit capability, allowing previously read data to be accessed again. The FIFO is put in retransmit mode by providing a retransmit mode (RTM) input signal. This event causes the current read address stored in the read address registers 52 and 54, the interleave status in toggle circuit 22, the data in the data output latches 18 and 20 and in the pipeline latch 42, and the status flags 44, to be saved in shadow registers 64, 66, 24, (30, 62, 70, 116 and 120. While the FIFO is in the retransmit mode, the occurrence of a Read From Mark input signal initiates the retransmit process, during which the saved read address count, output data and status flags are restored from their respective shadow registers, and the data from this restored starting point is retransmitted on the data out buffer 46. Data may be repeatedly retransmitted from the saved starting position. A new retransmit starting position may be selected after taking the FIFO out of retransmit mode by removing the RTM input signal.

6 Claims, 9 Drawing Sheets

FIFO WITH FAST RETRANSMIT MODE

BACKGROUND OF THE INVENTION

The present invention relates generally to digital electronic circuits and, more particularly, to a first-in, first-out memory buffer having the capability of retransmitting previously-read data.

The wide acceptance and current popularity of data transmission is evinced by the proliferation of digital peripheral equipment which is connectable to computer processors or the like. The transmission of data from one piece of equipment to another frequently requires communication between extremely fast operating equipment, such as processors, and relatively slower operating peripheral equipment such as disk storage systems and printers.

The most efficient use of such a system is realized when the several interconnected components of the system can communicate asynchronously, so that the faster operating equipment need not be delayed in order to communicate with the slower peripheral equipment.

It is a well-known practice to employ memory devices as intermediate buffers between the components of the system for storing data written therein by the transmitting equipment at one speed and for reading therefrom by receiving equipment at another speed. With this arrangement, it is imperative that memory storage space is available when the transmitting equipment transmits data. Moreover, when the memory storage space is full, it is necessary that the transmitting equipment be signaled so that further transmission cannot be accomplished. It is equally important that the destination equipment be signaled by the intermediate buffer when the memory storage space is empty so that further reading therefrom cannot be accomplished until additional data has been written therein by the transmitting equipment.

In the past, such requirements have been met by shift registers which serially write digital words therein at a desired speed, and which read serially therefrom at a different speed. Such devices are of limited storage and have unacceptable delay times. More recently, random access memories (RAM's) have been developed which have a first-in first-out (FIFO) characteristic. These memories can be quickly accessed to read out the oldest data stored in the memory. The movement of data within such memory is managed by a control section which maintains an account of which storage cells hold effective data. See, for example, U.S. Pat. Nos. 4,151,068 and 4,459,681.

Such asynchronous FIFO memories are normally equipped with status flag circuitry to detect various degrees of fullness of the memory array including EMPTY, FULL, HALF-FULL and various other fractions of the total memory capacity. However, there is often a need for a status flag to detect degrees of fullness other than these fixed fractions. As such, the users frequently desire the status flags that can be programmed and reprogrammed into the FIFO. See, for example, U.S. Pat. No. 5,084,841, "Programmable Status Flag Generator FIFO Using Gray Code," issued Jan. 28, 1992, and assigned to the same assignee as the present invention.

FIFO's are frequently used in data communications systems which include error detection schemes in the receiving module. In such a system, it is often desired to have a data transmission sequence repeated in the event that a burst or random error along the communications link may have corrupted the transmitted data. For this reason, FIFO's having a retransmit mode are currently available.

In currently available FIFO memory devices having retransmit, the implementation of this function has had several disadvantages. The usual way to offer this feature has been to allow the user to reset the read address pointer to an initial location (Word 0) of the FIFO when a retransmit was desired. This is not useful if the total number of write operations since the reset exceeds the depth of the FIFO. For example, assuming a FIFO having a depth of 1,024 words, a write process may start at Word 0 and write up to Word 1023. If five hundred read operations and four hundred write operations occur during the next time interval, the FIFO will then be one hundred write operations short of being full. At this instant, the write address pointer will be directed at Word 400 and the read address pointer at Word 500. If retransmit is now asserted, the read address pointer will be reset to Word 0, and the FIFO will read Words 0 through 499. The important thing to note here is that the first four hundred words read during this retransmit operation are newer than the last one hundred words. This should not occur since, by definition, the first four hundred words sent during the retransmit operation should be older than the last one hundred words written.

Other problems also occur with previous retransmit methods, such as the condition of the ALMOST FULL, ALMOST EMPTY and HALF FULL status flags which are present on many FIFO's. Status flag logic commonly performs a full subtract to establish status flags, or maintains comparisons of the read and write address pointers to look for specific differences, such as reads being 512 words behind writes. The former method is typically slower for deep FIFO's due to the size of the subtract. Where a retransmit function is provided, the latter method becomes difficult to implement because the compares look only for specific flag differences to establish status of the flags. If, for example, the compares look for an exact difference of 512 and the retransmit occurs, the HALF FULL may not represent the flag status correctly. Another disadvantage of the current retransmit method is the time delay between the assertion of the retransmit and the appearance of the retransmitted data at the data outputs, as well as the timing problems with the asynchronous assertion of retransmit and the write clock.

In view of the above, it is clear that there exists a need to develop a FIFO apparatus which provides improved retransmit capability over what is currently known in the art.

SUMMARY OF THE INVENTION

In accordance with the principles of the present invention, there is disclosed a first-in, first-out (FIFO) memory comprising a memory having a plurality of read-addressable memory locations; and a data output register coupled to the memory for reading data from at least one read-addressed memory location of the memory. The FIFO also comprises a read pointer for read-addressing the at least one memory location, the at least one read-addressed memory location having an address represented by a plurality of read address digits, a read address register in the read pointer being provided for storing each of the read address digits; and a write pointer for write-addressing the at least one memory location, the at least one write-addressed memory location having an address represented by a plurality of write address digits, a write address register in the write pointer being provided for storing each of the write address digits. The FIFO additionally comprises input means for receiving first and second control signals; and a shadow read address register coupled to the read address register and responsive to the first and second control signals. Actuation of the first control signal causes the read address digits stored in the read address register to be stored in the shadow read address register, and actuation of the second control signal causes the read address digits stored in the shadow read address register to be stored in the read address register.

BRIEF DESCRIPTION OF THE DRAWING

The foregoing features of the present invention may be more fully understood from the following detailed description, read in conjunction with the accompanying drawings, wherein.

DESCRIPTION OF THE PREFERRED EMBODIMENT

Figure 1A:
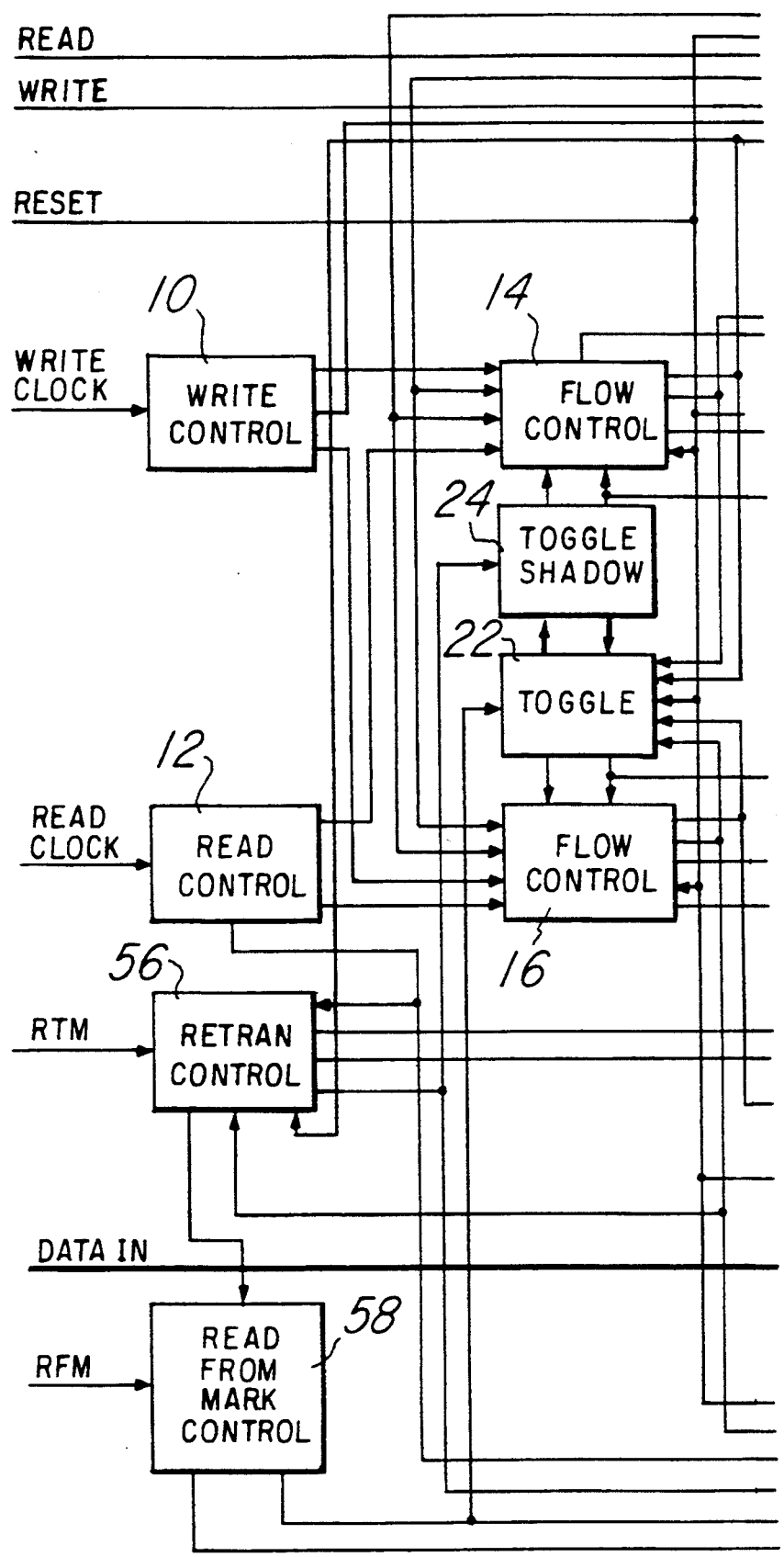
FIGS. 1a, 1b and 1c, referred to collectively as FIG. 1, comprise a block diagram of a first-in, first-out (FIFO) memory embodying the present invention.
Figure 1B:
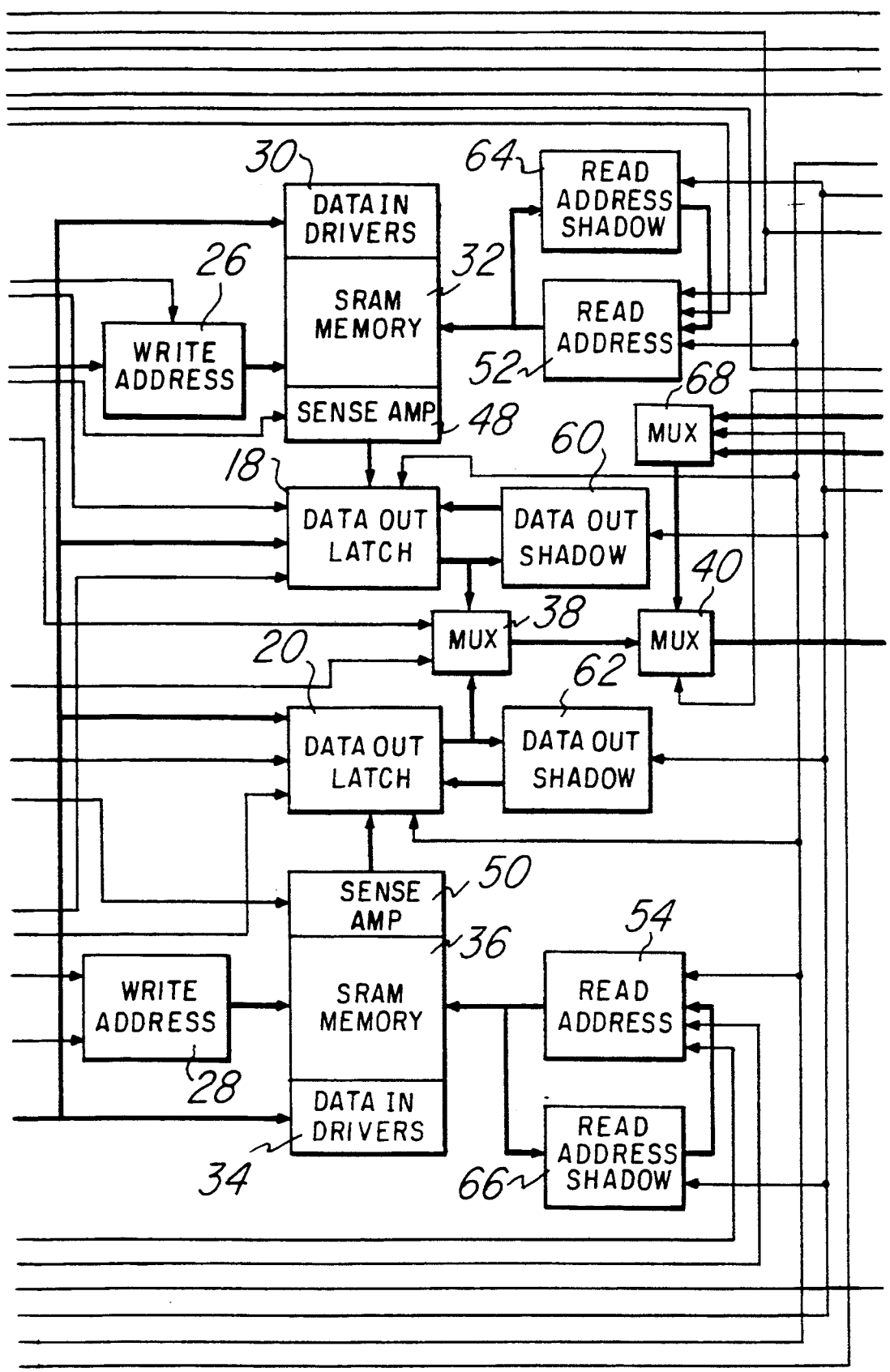
Figure 1C:
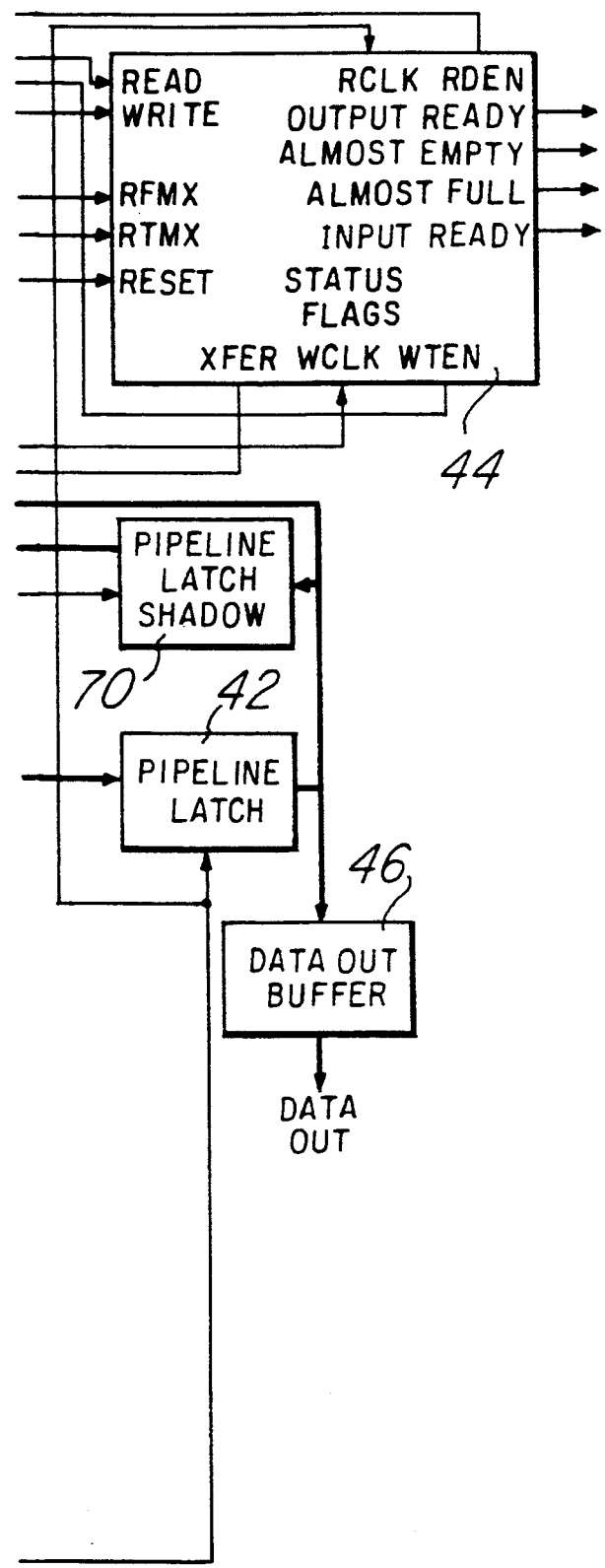

FIGS. 1a, 1b and 1c, when joined respectively in a left to right arrangement which shall be referred to as FIG. 1, illustrates a device embodying the present invention. This device is a high-speed, low-power, complementary metal-oxide semiconductor (CMOS) clocked first-in first-out (FIFO) memory. It includes a dual-port static random access memory (SRAM), illustratively 1,024 words of 36 bits each, which buffers data from a first data bus port, designated DATA IN, to a second data bus port, designated DATA OUT. In accordance with the present invention, the device has retransmit capability, which allows previously read data to be accessed again. The FIFO has status flags to indicate empty and full conditions and two programmable flags, almost full and almost empty, to indicate when a selected number of words is stored in memory.

A selected portion of the data in the FIFO may be read repeatedly when it is put in the retransmit mode. The FIFO is put in retransmit mode by providing a retransmit mode input signal (RTM). This event causes the current read address of the FIFO and the status flags to be saved. While the FIFO is in the retransmit mode, a high level on the READ FROM MARK (RFM) input signal initiates the retransmit process, during which the saved read address count and status flags are restored, and the data from this restored starting point is retransmitted on the DATA OUT bus. Data may be repeatedly retransmitted from the saved starting position. A new retransmit starting position may be selected after taking the FIFO out of retransmit mode by removing the RTM input signal.

Referring now to the specifics of FIG. 1, there is shown a block diagram of a FIFO memory having retransmit capability in accordance with the present invention. The description which follows refers to an embodiment in which the FIFO comprises an interleaved FIFO, wherein the data is written alternately between a first RAM, comprising the odd memory words, and a second memory RAM, comprising the even memory words. Such interleaved FIFO's are well known. See, for example, U.S. Pat. No. 5,255,242, "Sequential Memory," issued Oct. 19, 1993, to Ward et al., and assigned to the same assignee as the present application. From the description herein, one skilled in the art could relate the invention (downwardly) to a non-interleaved FIFO, thereby relieving the design of a significant level of complexity.

Write clock control circuit 10 comprises logic elements which are responsive to the WRITE CLOCK signal for generating write clocking pulses alternately to flow control circuit 14 and flow control circuit 16. Write clock control circuit 10 further provides a buffered write clock signal to status flag circuit 44 in order to set or reset certain status flags in synchronism with the write clock. Similarly, read clock control circuit 12 comprises logic elements which are responsive to the READ CLOCK signal for generating read clocking pulses alternately to flow control circuit 14 and flow control circuit 16. Read clock control circuit 12 further provides a buffered read clock signal to status flag circuit 44 in order to set or reset other status flags in synchronism with the read clock. In addition, read clock control circuit 12 provides clocking to the pipeline latch circuit 42 in order to speed data to the FIFO output.

Flow control circuits 14 and 16 provide clocking alternately to the odd and even memory sections of the interleaved FIFO. Flow control circuit 14 steers the write clock pulses from write clock control circuit 10 to the write address counter 26, and the read clock pulses from read clock control circuit 12 to the read address counter 52. In the interleaved arrangement of the FIFO described herein, flow control circuit 14 controls the write and read addressing of memory 32, which stores the odd-numbered words of the FIFO. Similarly, flow control circuit 16 steers the write clock pulses from write clock control circuit 10 to the write address counter 28, and the read clock pulses from read clock control circuit 12 to the read address counter 54. In the interleaved arrangement of the FIFO described herein, flow control circuit 16 controls the write and read addressing of memory 36, which stores the even-numbered words of the FIFO. Flow control circuits for FIFO's are well known; see, for example, U.S. Pat. No. 5,249,154, "Data Access Controller and Method," issued Sep. 28, 1993, to Tai et al., and assigned to the same assignee as the present application.

Toggle circuit 22 is responsible for coordinating the interleave between flow control circuits 14 and 16. Toggle circuit 22 detects the read and write clock pulses from flow control circuits 14 and 16, and provides read enable and write enable signals to each of these circuits in response thereto. Toggle circuit 22 provides interleaving control of the odd and even memory addressing for both read and write functions, independently.

Counter 26 provides the write addressing for static random access memory (SRAM) 32, which stores the odd memory words in the interleaving scheme. Counter 26 contains at its outputs the current address of the memory word to be written to. Once the write operation is complete, counter 26 is incremented by the odd write pulse from flow control circuit 14 to the next address. Similarly, counter 28 provides the write addressing for SRAM 36, which stores the even memory words in the interleaving scheme. Counter 28 contains at its outputs the current address of the memory word to be written to. Once the write operation is complete, counter 28 is incremented by the even write pulse from flow control circuit 16 to the next address.

Counter 52 provides the read addressing for SRAM 32. Counter 52 contains at its outputs the current address of the odd-numbered memory word to be read from. Once the read operation is complete, counter 52 is incremented by the odd read pulse from flow control circuit 14 to the next address. Similarly, counter 54 provides the read addressing for SRAM 36. Counter 54 contains at its outputs the current address of the even-numbered memory word to be read from. Once the read operation is complete, counter 54 is incremented by the even read pulse from flow control circuit 16 to the next address.

SRAM 32 includes the drivers/latches 30 which hold the data to be written into the odd memory word which is currently addressed by counter 26. Drivers/latches 30 receive data which is input to the FIFO of the present invention on the DATA IN signal lines. Similarly, SRAM 36 includes the drivers/latches 34 which receive data input on the DATA IN signal lines. This data is enabled from drivers/latches 34 into the even memory word which is currently addressed by counter 28. Flow control circuits 14 and 16 are also responsive to the status flag circuit 44 so as to enable writing of the DATA IN signals directly to the data out latches 18 and 20, respectively, as well as to SRAM's 32 and 36, respectively, when the status flag circuit 44 determines that the FIFO is empty.

SRAM 32 also includes the sense amplifiers 48 which drive the data out latches 18 from the contents of SRAM 32 at the odd-numbered memory location addressed by read address counter 52. Similarly, SRAM 36 includes the sense amplifiers 50 which drive the data out latches 20 from the contents of SRAM 36 at the even-numbered memory location addressed by read address counter 54. Data out latches 18 and 20 are coupled to the data inputs of multiplexer (MUX) 38 which, under the direction of read enable signals from toggle circuit 22, steers the appropriate data set to one set of data inputs of MUX 40.

MUX 40 provides the selection between normal and retain data modes. In the normal mode, MUX 40 couples the data from MUX 38 to pipeline latch 42, which, in the present embodiment, comprises a 36-bit-wide latch of clocked flip-flops. However, when status flag circuit 44 determines that there is no more data in the FIFO to transfer out, the XFER signal steers MUX 40 so as to retain the data in pipeline latch 42 by the loopback path through MUX 68. Data out buffer 46, coupled to the data output lines of pipeline latch 42, provides additional drive capacity to the DATA OUT signals from the FIFO.

In accordance with the principles of the present invention, elements are included within the FIFO thus far described in order to facilitate a data retransmit mode which operates in a manner that is significantly improved over FIFO's of the prior art. These elements include the retransmit mode circuit 56, the read from mark circuit 58, MUX 68, and a number of shadow latches including toggle shadow latch 24, read address shadows 64 and 66, data out shadows 60 and 62 and pipeline latch shadow 70. In addition, status flag circuit 44 is modified to include shadowing of the read address comparison and flag latching functions, as will be described in later paragraphs in conjunction with FIG. 2.

The retransmit mode is entered by an assertion of the RTM (ReTransmit Mode) signal during a positive-going transition of the READ CLOCK signal. This action generates signals within the FIFO which have the effect of storing all of the information relating to the read functions. The information in toggle circuit 22 is stored in toggle shadow latch 24. The read address counters 52 and 54 is stored, respectively, in read address shadow latches 64 and 66. The information in data out latches 18 and 20 is stored, respectively, in data out shadow latches 60 and 62. The information in pipeline latch 42 is stored in pipeline latch shadow 70. Finally, some of the information within the status flag circuit 44 is stored in shadow latches therein. It will be noted that during the normal operating mode of the FIFO, i.e., without the retransmit mode initiated, the above-mentioned shadow latches are entirely transparent to the circuit that they shadow. That is, the information at each latch is simultaneously read by its corresponding shadow latch, but is latched into the shadow latch only upon the initiation of the retransmit mode.

The retransmit process is initiated by an assertion of the RFM (Read From Mark) signal during a positive-going transition of the READ CLOCK signal. This signal activation causes the contents of toggle shadow latch 24 to be reloaded into the toggle latches 22, and the contents of the data out shadow latches 60 and 62 to be restored to their corresponding data out latches 18 and 20. It also causes the contents of read address shadow latches 64 and 66 to be reloaded into their corresponding read address latches 52 and 54. The RFM signal additionally changes the input steering of MUXes 40 and 68, such that the contents of pipeline shadow latch 70 is restored to pipeline latch 42. Finally, the RFM signal is coupled to status flags circuit 44 for restoration of the information stored in the shadow latches therein, as will be described in later paragraphs in conjunction with FIG. 2.

Figure 2A:
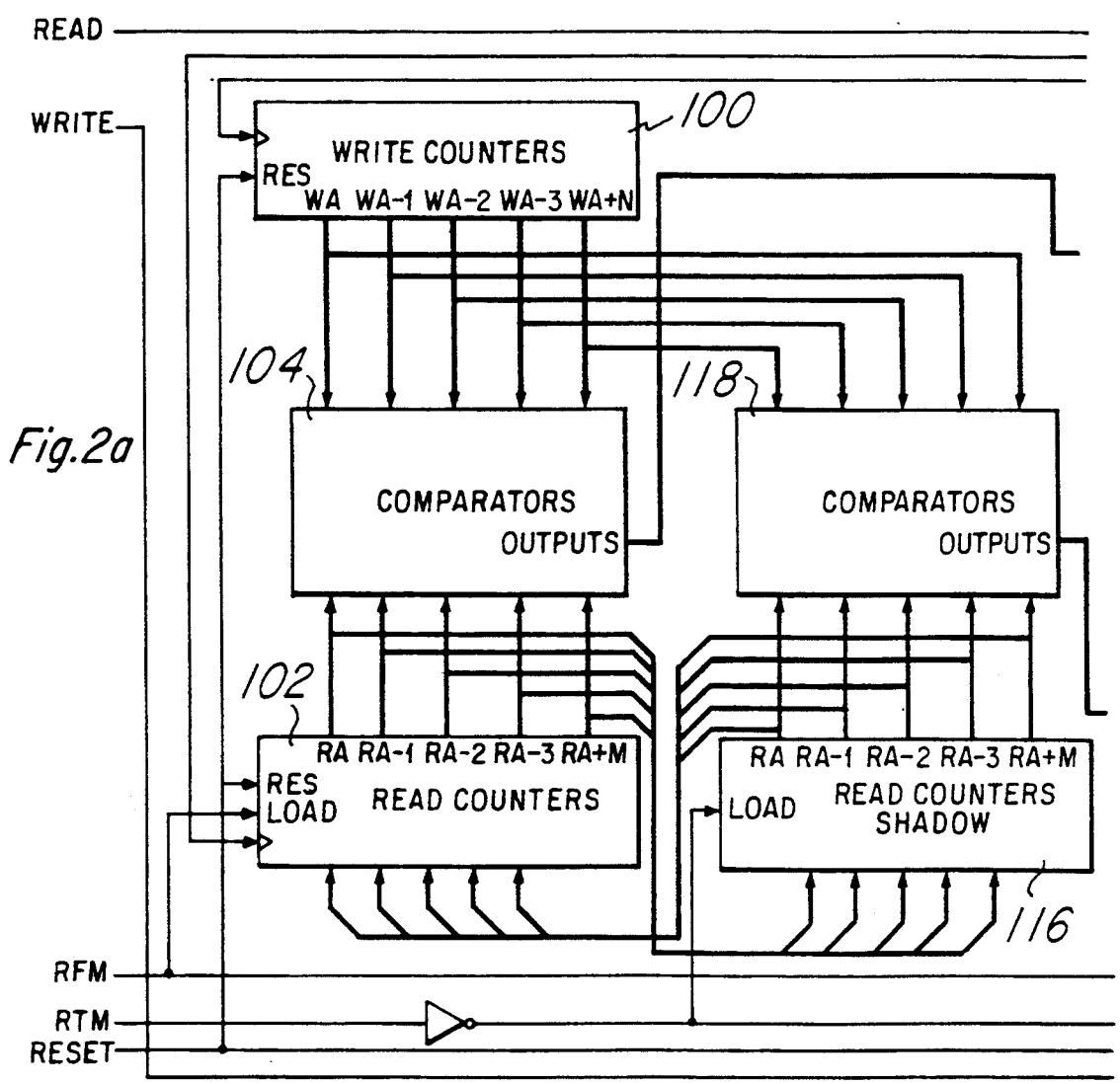
FIGS. 2a and 2b, referred to collectively as FIG. 2, comprise a detailed block diagram of the status flag circuit of FIG. 1 including elements for providing retransmit in accordance with the present invention.
Figure 2B:
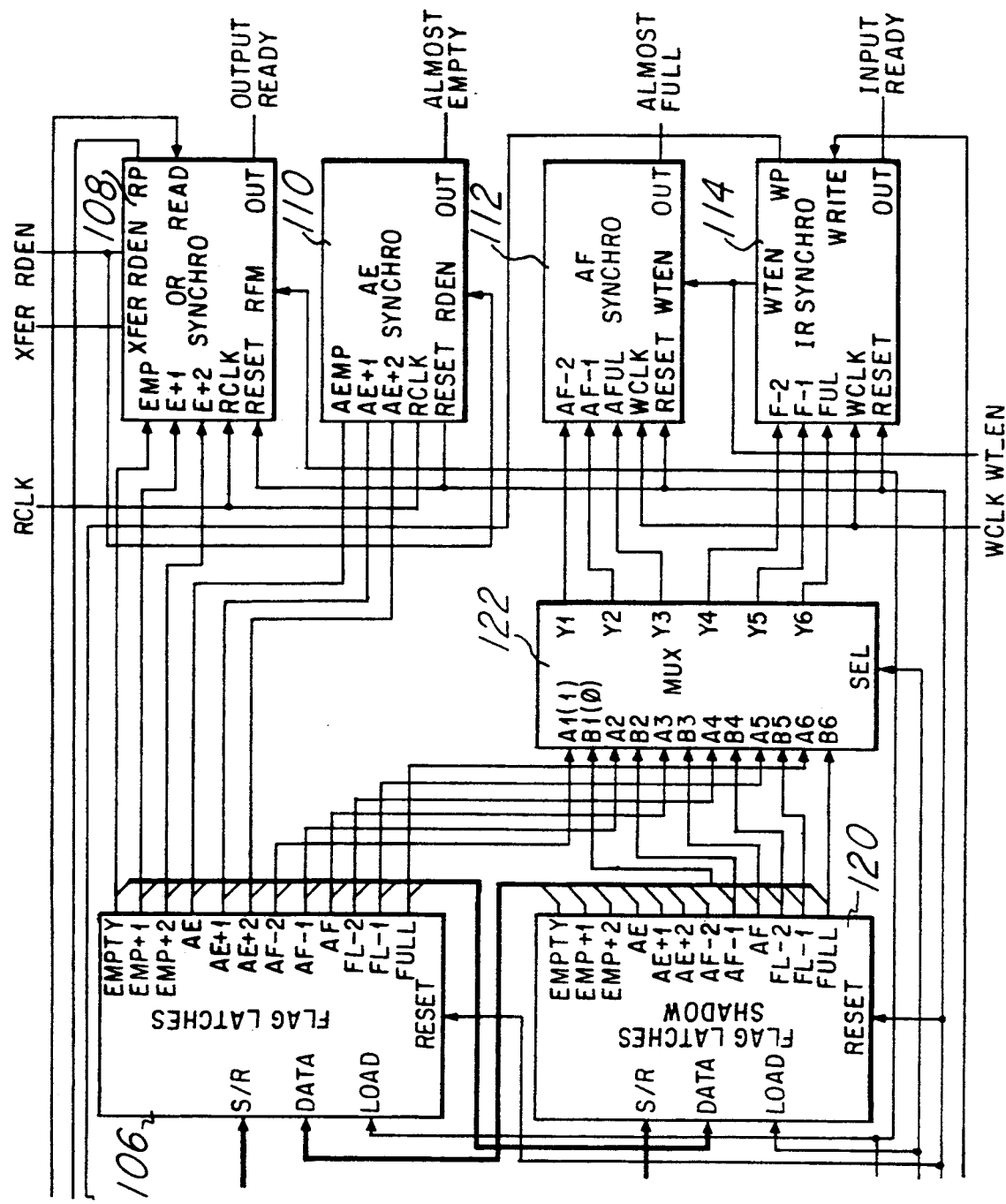

FIGS. 2a and 2b, when joined respectively in a left and right arrangement which shall be referred to as FIG. 2, shows a logic block diagram of the status flags circuit 44 of FIG. 1. Status circuit 44 comprises write pulse counters 100, read pulse counters 102, comparators 104, flag latches 106, output ready synchronizer 108, almost empty synchronizer 110, almost full synchronizer 112 and input ready synchronizer 114. Write pulse counters 100 comprise a plurality of counters which are incremented on every occurrence of a write clock pulse (WP) received from input ready synchronizer 114. The WP signal is derived from the WCLK (Write Clock) signal generated by write clock control circuit 10 (of FIG. 1). Write pulse counters 100 provide, in the present embodiment, a first address bus WA having the current write pulse count, a second address bus WA−1 having one less than the current write pulse count, a third address bus WA−2 having two less than the current write pulse count, a fourth address bus WA−3 having three less than the current write pulse count, and a fifth address bus WA +N, which is preset to some user definable value of N when the FIFO is reset.

Similarly, read pulse counters 102 comprise a plurality of counters which are incremented on every occurrence of a read clock pulse (RP) received from output ready synchronizer 108. The RP signal is derived from the RCLK (Read Clock) signal generated by read clock control circuit 12 (of FIG. 1). Read pulse counters provide, in the present embodiment, a first address bus RA having the current read pulse count, a second address bus RA−1 having one less than the current read pulse count, a third address bus RA−2 having two less than the current read pulse count, a fourth address bus RA−3 having three less than the current read pulse count, and a fifth address bus RA+M, which is preset to the user definable value of M when the FIFO is reset.

Comparators 104 comprise a plurality of comparing circuits which are each coupled, at a first set of input terminals, to an input address bus selected from among WA, WA−1, WA−2, WA−3 and WA+N, and coupled, at a second set of input terminals, to an input address bus selected from among RA, RA−1, RA−2, RA−3 and RA+M, to thereby provide write and read address flag status to flag latches 106. In the present embodiment, comparators 104 comprise comparing circuits which provide status indicators of FULL, FULL−1, FULL−2, ALMOST FULL, ALMOST FULL−1, ALMOST FULL−2, ALMOST EMPTY, ALMOST EMPTY+1, ALMOST EMPTY+2, EMPTY, EMPTY+1 and EMPTY+2. These status indicator signals are held in the flag status latches 106 and are coupled selectively to the output ready synchronizer 108, almost empty synchronizer 110, almost full synchronizer 112 and input ready synchronizer 114.

The disclosed embodiment employs four status flags: INPUT READY (IR), OUTPUT READY (OR), ALMOST FULL (AF), and ALMOST EMPTY (AE). The active state of the IR flag indicates that there is at least one empty memory word into which data may be written. The active state of the OR flag indicates that there is at least one memory word containing data which may be read. The active state of the AF flag indicates that there are at least "N" empty memory words into which data may be written. The active state of the AE flag indicates that there are at least "M" memory words containing data which may be read. "N" and "M" are binary numbers which are selected by the user and are programmed upon reset of the FIFO.

To generate status flags, it is necessary to maintain counts of FIFO writes and reads and look for specific differences between the counts. The counts are maintained by the write counters 100 and read counters 102. The write and read counts are reset to zero upon a FIFO reset. The write count is incremented when a pulse occurs on the WP signal from the IR synchronizer 114. This happens on a low-to-high transition of the WRITE CLOCK signal while WRITE is high and INPUT READY is high. The read count is incremented when a pulse occurs on the RP signal from the OR synchronizer 108. This happens on a low-to-high transition of the READ CLOCK signal while READ is high and OUTPUT READY is high. For this reason, the count differences can change due to either clock, as the write and read clocks are asynchronous with respect to each other. Comparators 104 compare the write and read counts and generate signals which represent specific differences in the counts. These signals are used to set and reset the outputs of a group of flag latches 106. These latch outputs are used as a set of twelve intermediate status flags (EMPTY, EMP+1, .., FULL) which are asynchronous, i.e., they can each change state due to either clock.

It is desired that the IR and AF flags be synchronous to the WRITE CLOCK, and that the OR and AE flags be synchronous to the READ CLOCK. Since the WRITE and READ CLOCKS are asynchronous to each other, in order to provide adequate meta-stability performance, each flag is synchronized to the clock using a two-stage clocked flip-flop synchronizer. This means that there is a delay of two clock cycles from the synchronizer inputs to the outputs. For this reason, it is attempted to predict the future status of each flag two cycles ahead of time. In the case of the IR flag, this means generating a signal indicating that while performing writes alone, if two more writes occur, then the FIFO will be full. This signal is called "FULL MINUS TWO" or F−2 on the IR synchronizer 114, and is active when there are zero, one, or two memory locations available for writes. Once the FIFO is full, no more writes can occur, only reads. Once reads begin, it is desired that the IR flag indicate that the FIFO is no longer full as soon as possible. It takes three reads for F−2 to go inactive and then another two WRITE CLOCK cycles for the status to ripple through the IR synchronizer 114. To decrease this time, an intermediate flag signal called FUL is needed to indicate the FIFO is no longer full. When IR is active, it is the FUL signal that is selected to ripple through the synchronizer 114 so it takes only one read plus two WRITE CLOCK cycles for the IR status to be updated. When the FIFO is one or two words from being full and writes and reads occur together, there is a need for a third intermediate flag called F−1 to help keep a more accurate status of the FIFO. The other three synchronizers 108, 110 and 112 work in a manner identical to that of the IR synchronizer 114.

As previously demonstrated, there are three intermediate flag signals needed to generate each synchronized flag. The IR synchronizer 114 uses signals FUL, F−1, and F−2. This embodiment uses a FIFO depth of 1,024 words. Signal FUL is active when the difference between the write and read counts (WA−RA) equals the maximum depth, or 1,024 words. Signal F−1 is active when WA−RA equals 1,023 or 1,024 words. Signal F−2 is active when WA−RA equals 1,022, 1,023, or 1,024 words. The OR synchronizer 108 uses signals EMP, E+1, AND E+2. EMP is active when WA−RA equals 0 words. E+1 is active when WA−RA equals 0 or 1 word. E+2 is active when WA−RA equals 0, 1, or 2 words. The AF synchronizer 112 uses signals AEMP, AE+1, and AE+2. AEMP is active when WA−RA equals N or fewer words. AE+1 is active when WA−RA equals (N+1) or fewer words. AE+2 is active when WA−RA equals (N+2) or fewer words. The AE synchronizer 110 uses signals AFUL, AF−1, and AF−2. AFUL is active when WA−RA equals (1,024−M) or more words. AF−1 is active when WA−RA equals (1,024−M−1) or more words. AF+2 is active when WA−RA equals (1,024−M−2) or more words.

To generate, for example, AEMP, it is required to determine when there are N or fewer words in the FIFO, or that WA−RA equals N or fewer. It is not practical to compare WA to RA and decode every possible difference. Assuming that an active state for AEMP is a logic high level, it is known that AEMP goes from low to high only when WA−RA changes from a value of N+1 to N. AEMP goes from high to low only when WA−RA changes from a value of N to N+1. For this reason, it is only required to detect values of N and N+1 for WA−RA. In other words, it is required to know when WA−RA=N and WA−RA=N+1. The values WA and RA are generated by WRITE and READ counters and are digitally equivalent to the FIFO write address and read address, although these signals are not necessarily the same ones which actually address the memory. In this embodiment, signals WA and RA each consist of a 10-bit digital word. To avoid momentary false values being decoded, which occurs when multiple outputs switch in a binary counter, the counters count using a "Gray-code" in which only one output ever switches from one count to the next. For this reason, the value WA−RA is not actually generated because a Gray-code subtractor is not practical if even possible to implement. However, rewriting the equations WA−RA=N and WA−RA=N+1 as WA=RA+N and WA−1=RA+N, it is clear that the required signals can be found by generating the values of WA, WA−1, and RA+N and comparing them with two 10-bit comparators. The comparator outputs then are used to set and reset the outputs of the AE latch in flag latches 106. Signal WA is simply the output of a Gray-code counter which is set to zero during a FIFO reset and which gets incremented on every FIFO write. Signal WA−1 is easily generated by clocking signal WA through a 10-bit register on every FIFO write since WA is always an ascending count. Signal RA+N is simply the output of a Gray-code counter which is preset to the value N during a FIFO reset and is incremented on every FIFO read. From the previous explanation, the following table can be generated which lists all the required compare signals necessary to generate the intermediate flags.

| FLAG | COMPARE SIGNALS |
| --- | --- |
| EMP | WA=RA, WA−1=RA |
| E+1 | WA−1=RA, WA−2=RA |
| E+2 | WA−2=RA, WA−3=RA |
| AE | WA=RA+N, WA−1=RA+N |
| AE+1 | WA−1=RA+N, WA−2=RA+N |
| AE+2 | WA−2=RA+N, WA−3=RA+N |
| AF−2 | WA+M=RA−2, WA+M=RA−3 |
| AF−1 | WA+M=RA−1, WA+M=RA−2 |
| AF | WA+M=RA, WA+M=RA−1 |
| F−2 | WA=RA−2, WA=RA−3 |
| F−1 | W=RA−1, WA=RA−2 |
| FUL | WA=RA, WA=RA−1 |

With this information, it is clear that the write counters 100 must generate signals WA, WA−1, WA−2, WA−3, and WA+N. Also, the read counters 102 must generate signals RA, RA−1, RA−2, RA−3, and RA+M.

Synchronizers such as are briefly described above are well known in the art, and may be of the type disclosed in U.S. patent Ser. No. 071,626,918, "First-In First-Out Memory," filed Dec. 13, 1990, for D. Ward et al, now U.S. Pat. No. 5,274,600, issued on Dec. 28, 1993, and assigned to the same assignee as the present application. Such status flag circuitry as is briefly described above is well known in the art, and may be of the type disclosed in U.S. Pat. No. 5,084,841, "Programmable Status Flag Generator FIFO Using Gray Code," issued Jan. 28 1992, to D. Ward, and assigned to the same assignee as the present application, which patent is incorporated herein by reference.

In accordance with the principles of the present invention, elements are included within the status circuit thus far described in FIG. 2 in order to facilitate the data retransmit mode. These elements include read address counters shadow latches 116, comparators 118, flag latches shadow 120 and MUX 122. As mentioned earlier in relation to FIG. 1, the retransmit mode is entered by an assertion of the RTM signal during a positive-going transition of the READ CLOCK signal. This action effects the immediate storing of all of the information in status circuit 44 relating to the read functions. Upon the occurrence of the RTM signal with the rising edge of the READ CLOCK signal, the information at the output buses of read address counters 102 is latched into read address counters shadow latches 116, and the output signals of flag latches 106 is latched into the latches comprising flag latches shadow 120. At this point, comparators 118, which may be substantially identical to comparators 104, monitor the FULL, FULL−1, FULL−2, ALMOST FULL, . . . , EMPTY, EMPTY+1 and EMPTY+2 status of the current write pulse count information provided from write pulse counters 100 with the read address information stored in read address counters shadow latches 116, which represents the read address status at the instant the retransmit mode was entered.

MUX 122 receives input signals relating to the FULL and ALMOST FULL conditions from flag latches 106 and flag latches shadow 120 and selectively applies the signals from one or the other of these devices to the almost full synchronizer 112 and the input ready synchronizer 114. In the normal operating mode, i.e., without the retransmit mode initiated, the signals relating to the FULL and ALMOST FULL conditions from flag latches 106, the "A" inputs, are steered to synchronizers 112 and 114. In the retransmit mode, however, the "B" inputs, from the flag latches shadow 120 are steered to synchronizers 112 and 114. In the retransmit mode, status flag circuit 44 monitors the FULL and ALMOST FULL conditions of the FIFO with respect to the instant when the retransmit mode was entered in order to assure that new data is not written over the data which may eventually be retransmitted.

When the retransmit process is initiated, via activation of the RFM signal during a positive-going transition of the READ CLOCK signal, the read address information which had been stored in the read counters shadow latches 116 at the onset of the retransmit mode is reloaded into the read counters 102, and the FULL, FULL−1, FULL−2, ALMOST FULL, . . . , EMPTY, EMPTY+1 and EMPTY+2 status signals which had been stored in the flag latches shadow 120 at the onset of the retransmit mode, and which may have been updated due to write operations, are reloaded into the flag latches 106.

Figure 3:
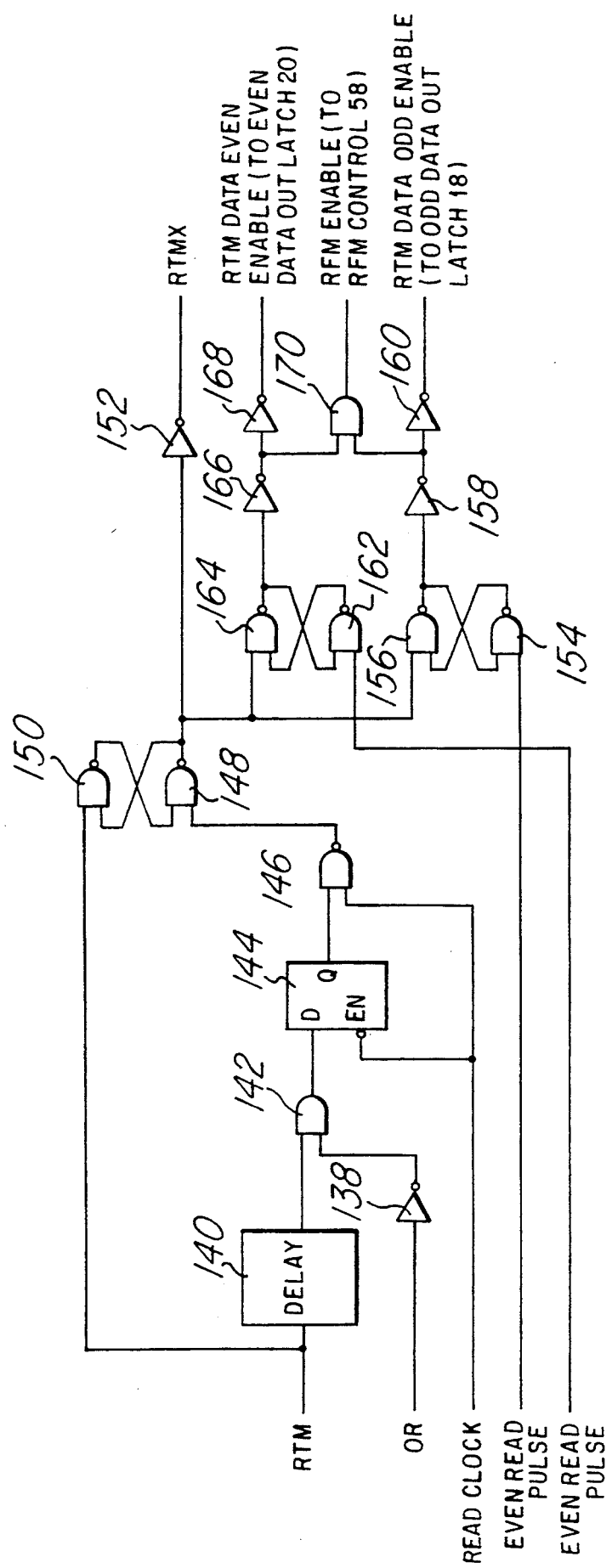
FIG. 3 is a detailed logic diagram of the retransmit control circuitry of the FIFO of FIG. 1.

Referring now to FIG. 3, there is shown a detailed logic diagram of the retransmit control circuitry 56 of the FIFO of FIG. 1. OR, a low-level signal indicating that the FIFO output is ready, is inverted by inverter 138, whose output signal is applied as a first input to AND gate 142. The second input is coupled to the RTM input signal after passing through delay element 140, which may typically comprise a even number of inverters, illustratively six. The delay provided by delay element 140 assures that adequate set up and hold time are provided. The output of AND gate 142 is coupled as the data input to latch circuit 144, which passes the output state of gate 142 to its Q output on a low level of the READ CLOCK. Gate 146 gates the Q output from latch 144 with the positive level of the READ CLOCK to generate a setting pulse to the flip-flop formed by cross-coupled NAND gates 148 and 150. This flip-flop is normally held reset by the absence of the RTM signal; however, when RTM goes high, the jam reset is removed from gate 150. The output signal from gate 148 is coupled to inverter 152, whose output generates the RTMX signal, a low-going pulse which locks the data from toggle circuit 22 to toggle shadow 24, the data from read address latches 52 and 54 into read address shadows 64 and 66, the data from data out latches 18 and 20 into data out shadows 60 and 62, and the data from pipeline latch 42 into pipeline latch shadow 70 (in FIG. 1), and the data from read counters 102 into read counters shadow 116 (in FIG. 2).

The high-going transition at the output of gate 148, in response to the occurrence of the RTM signal, also removes the jam resets from the flip-flops comprising gates 154 and 156 and gates 162 and 164. This allows the flip-flops to be set upon the next subsequent occurrence of the corresponding read clock pulse. In particular, the next odd read pulse, applied to an input of NAND gate 154, causes the output of NAND gate 156 to go to a high logic level, resulting in a high level on the RTM DATA ODD ENABLE signal coupled from inverter 160 to odd data out latch 18 (in FIG. 1). Similarly, the next even read pulse, applied to an input of NAND gate 162, causes the output of NAND gate 164 to go to a high logic level, resulting in a high level on the RTM DATA EVEN ENABLE signal coupled from inverter 168 to even data out latch 20 (in FIG. 1).

Figure 4:
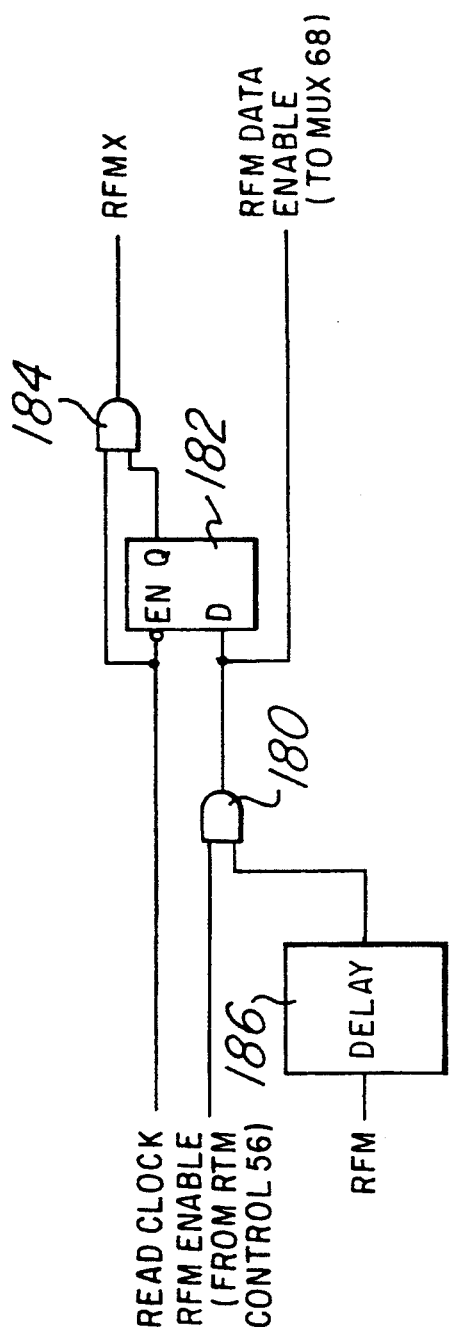
FIG. 4 is a detailed logic diagram of the read from mark control circuitry of the FIFO of FIG. 1.

When both of the flip-flops comprising gates 154 and 156 and gates 162 and 164 are set, i.e., both an odd read pulse and an even read pulse have occurred subsequent to the occurrence of RTM, the outputs of both inverters 158 and 166 will be high, thereby enabling a high-level output from AND gate 170, which provides the RFM ENABLE signal to the RFM control circuit (FIG. 4).

Referring now to FIG. 4, there is shown a detailed logic diagram of the read from mark (RFM) control circuitry 58 of the FIFO of FIG. 1. RTMX, the clocked RTM signal generated by the circuitry shown in FIG. 3, is coupled to a first input of AND gate 180; the second input is coupled to the RFM input signal after passing through delay element 186, which may typically comprise a even number of inverters, illustratively six. The delay provided by delay element 186 assures that adequate set up and hold time are provided. The output of AND gate 180 provides an RFM DATA ENABLE signal which is coupled as the select input to MUX 68 (of FIG. 1). Latch circuit 182 passes the output state of gate 180 to its Q output on the low logic level of the READ CLOCK. The Q output from latch 182 is gated by the positive level of the READ CLOCK to generate the clocked RFM pulse, RFMX, which is coupled to the read address counters 52 and 54, read counters 102 of status flags circuit 44, data out latches 18 and 20, and toggle circuit 22 (of FIG. 1).

Figure 5:
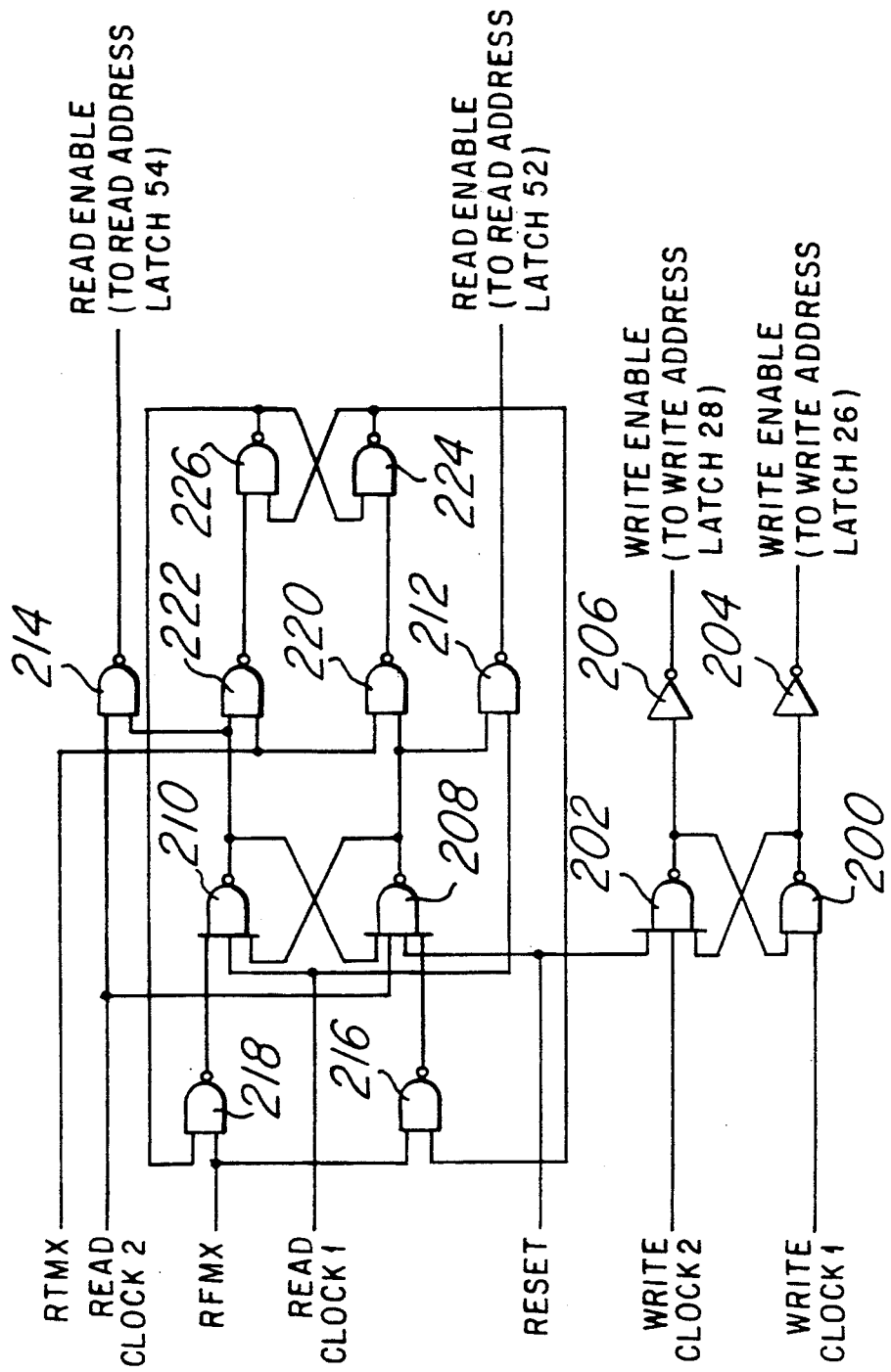
FIG. 5 is a detailed logic diagram of the toggle and toggle shadow circuits of FIG. 1.

Referring now to FIG. 5, there is shown a detailed logic diagram of the toggle circuit 22 and toggle shadow circuit 24 of the FIFO of FIG. 1. Toggle circuit 22 comprises gates 200 and 202 (which form a cross-coupled flip-flop), inverters 204 and 206, gates 208 and 210 (which form a cross-coupled flip-flop), and gates 212 and 214. Toggle shadow circuit 24 comprises gates 216, 218, 220 and 222, and gates 224 and 226 (which form a cross-coupled flip-flop). The flip-flop formed by gates 200 and 202, and inverters 204 and 206 is responsive to WRITE CLOCK 1 and WRITE CLOCK 2 received from flow control circuits 14 and 16, respectively, to provide WRITE ENABLE signals alternately to write address latches 26 and 28, and is unrelated to the operation of toggle shadow circuit 24.

The flip-flop formed by gates 208 and 210, and gates 212 and 214 are responsive to READ CLOCK 1 and READ CLOCK 2 received from flow control circuits 14 and 16, respectively, to provide READ ENABLE signals alternately to read address latches 52 and 54. On the occurrence of the RTMX signal, the clocked version of the RTM input signal, the status of the flip-flop formed by gates 208 and 210 is transferred via gates 220 and 222 to the cross-coupled flip-flop formed by gates 224 and 226. The status is held in this latter flip-flop until the RFMX signal, the clocked version of the RFM input signal, enables gates 216 and 218, thereby coupling the status of the flip-flop comprising gates 224 and 226 into the flip-flop formed by gates 208 and 210.

Figure 6:
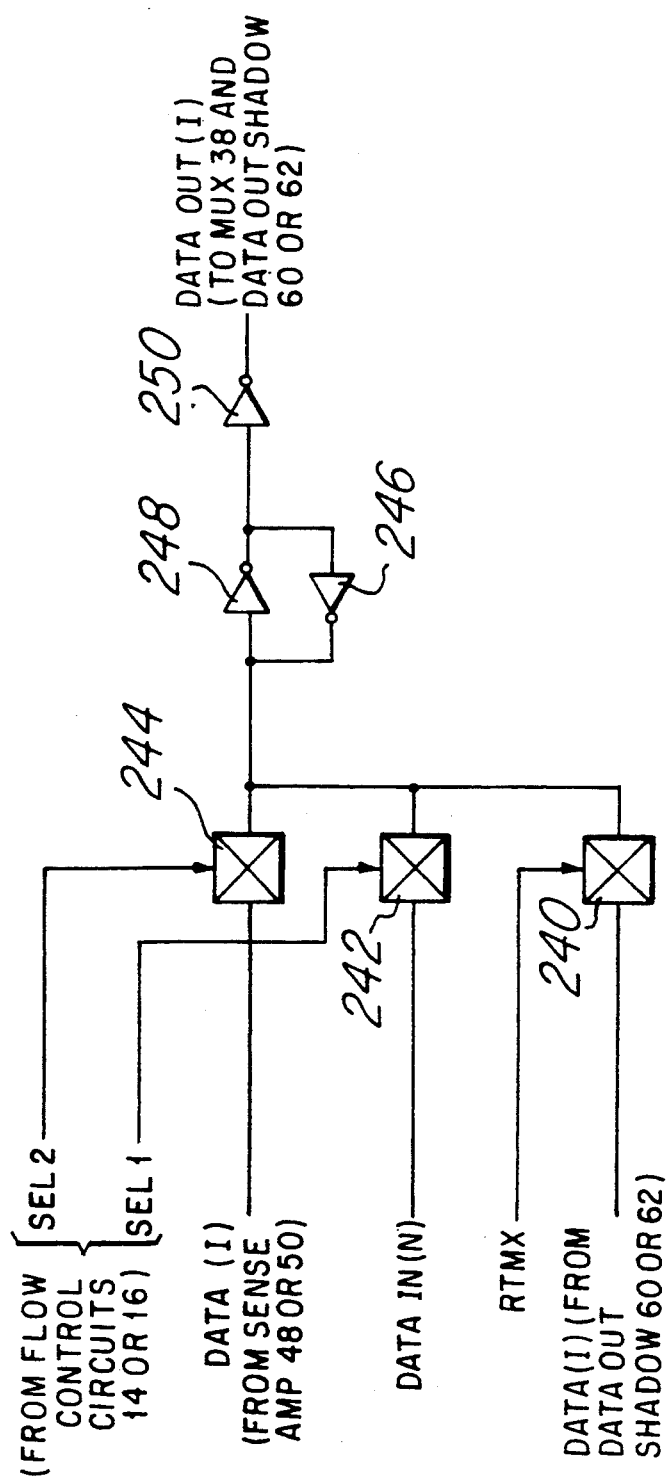
FIG. 6 is a detailed logic diagram of one of the data out latches of the FIFO of FIG. 1.

Referring now to FIG. 6, there is shown a detailed logic diagram of one of the latches from among the plurality of latches comprising data out latch circuitry 18 and 20. In the illustrative FIFO described herein and shown in FIG. 1, each of the circuits comprising data out latch 18 and data out latch 20 includes 36 of the latches of the type shown in FIG. 6.

The latch of FIG. 6 comprises transfer gates 240, 242 and 244, a latching circuit comprising inverters 246 and 248, and an output inverter 250. Considering the illustrated latch to correspond to the Ith data bit (of 36), transfer gate 242 receives DATA IN(I), from the FIFO's input data stream, which is gated through by a select line, SEL 1, received from either of the flow control circuits 14 or 16. Transfer gate 244 receives DATA(I) from either sense amplifier 48 or 50, which is gated through by a select line, SEL 2, received from the corresponding flow control circuit 14 or 16. Transfer gate 240 receives DATA(I) from either data out shadow 60 or 62, which is gated through by the RTMX signal received from the retransmit control circuitry 56 illustrated in FIG. 3.

The combined outputs of transmit gates 240, 242 and 244 are coupled to the latch comprising inverters 246 and 248. The latch output is inverted by inverter 250, thereby generating the DATA OUT(I) signal which is coupled to MUX 38 and to one of data out shadow 60 or 62.

While the principles of the present invention have been demonstrated with particular regard to the structure and method disclosed herein, it will be recognized that various departures may be undertaken in the practice of the invention. The scope of the invention is not intended to be limited to the particular structure and method disclosed herein, but should instead be gauged by the breadth of the claims which follow.

What is claimed is:

1. A first-in, first-out (FIFO) memory comprising:
   a memory having a plurality of read-addressable memory locations;
   a data output register coupled to said memory for reading data from at least one read-addressed memory location of said memory;
   a read pointer for read-addressing said at least one memory location, said at least one read-addressed memory location having an address represented by a plurality of read address digits, a read address register in said read pointer being provided for storing said read address digits;

a write pointer for write-addressing said at least one memory location, said at least one write-addressed memory location having an address represented by a plurality of write address digits, a write address register in said write pointer being provided for storing said write address digits;

input means for receiving first and second control signals; and a shadow read address register coupled to said read address register and said shadow read address register and said read address register being responsive to said first and second control signals, wherein actuation of said first control signal causes the read address digits stored in said read address register to be stored in said shadow read address register, and actuation of said second control signal causes the read address digits stored in said shadow read address register to be stored in said read address register.

2. The FIFO memory in accordance with claim 1 further including a shadow data output register coupled to said data output register and said shadow data output register and said data output register being responsive to said first and second control signals, wherein actuation of said first control signal causes the data stored in said data output register to be stored in said shadow data output register, and actuation of said second control signal causes the data stored in said shadow data output register to be stored in said data output register.

3. The FIFO memory in accordance with claim 1 further including:
a status flags register for storing information relating to an input ready and output ready status of said FIFO memory; and
a shadow status flags register coupled to said status flags register and said shadow status flags register and said status flags register being responsive to said first and second control signals, wherein actuation of said first control signal causes the information stored in said status flags register to be stored in said shadow status flags register, and actuation of said second control signal causes the information stored in said shadow status flags register to be stored in said status flags register.

4. An interleaved first-in, first-out (FIFO) memory comprising:
first and second memories each having a plurality of read-addressable memory locations;
first and second data output registers coupled respectively to said first and second memories for reading data from the memory locations of said memories;
first and second read pointers for read-addressing said memory locations of said first and second memories respectively, said read-addressed memory locations of each memory having addresses represented by a plurality of read address digits, a read address register in each of said read pointers being provided for storing said read address digits of the respective memory locations;

first and second write pointers for write-addressing said memory locations of said first and second memories respectively, said write-addressed memory locations of each memory having addresses represented by a plurality of write address digits, a write address register in each of said write pointers being provided for storing said write address digits of the respective memory locations;

input means for receiving first and second control signals; and first and second shadow read address registers coupled to said corresponding first and second read address registers and said shadow read address registers and said read address registers being responsive to said first and second control signals, wherein actuation of said first control signal causes the read address digits stored in said first and second read address registers to be stored in said respective first and second shadow read address registers, and actuation of said second control signal causes the read address digits stored in said first and second shadow read address registers to be stored in said respective first and second read address registers.

5. The interleaved FIFO memory in accordance with claim 4 further including first and second shadow data output registers coupled to said respective first and second data output registers and said shadow data output registers and said data output registers being responsive to said first and second control signals, wherein actuation of said first control signal causes the data stored in said first and second data output registers to be stored in said respective first and second shadow data output registers, and actuation of said second control signal causes the data stored in said first and second shadow data output registers to be stored in said respective first and second data output registers.

6. The interleaved FIFO memory in accordance with claim 4 further including:
a status flags register for storing information relating to an input ready and output ready status of said FIFO memory; and
a shadow status flags register coupled to said status flags register and said shadow status flags register and said status flags register being responsive to said first and second control signals, wherein actuation of said first control signal causes the information stored in said status flags register to be stored in said shadow status flags register, and actuation of said second control signal causes the information stored in said shadow status flags register to be stored in said status flags register.

* * * * *